Figure 1:
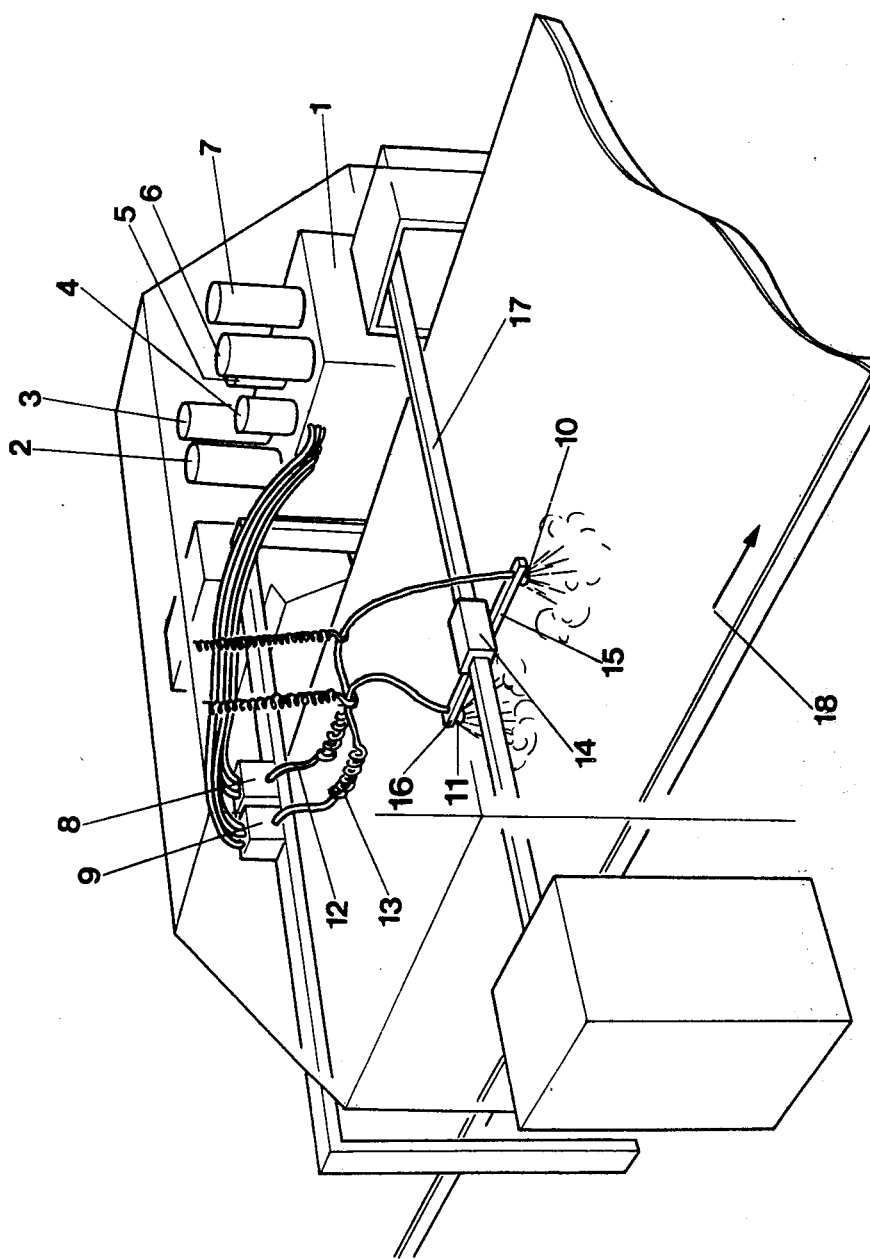

United States Patent [19]  
Gilbert

[11] 4,156,041  
[45] May 22, 1979

[54] DEPOSITION OF POLYURETHANE FOAM-FORMING LIQUID REACTION MIXTURE

[75] Inventor: David S. Gilbert, Manchester, England

[73] Assignee: Imperial Chemical Industries Limited, London, England

[21] Appl. No.: 901,797

[22] Filed: May 1, 1978

Related U.S. Application Data

[62] Division of Ser. No. 740,023, Nov. 8, 1976.

[30] Foreign Application Priority Data

Nov. 27, 1975 [GB] United Kingdom ............... 48783/75

[51] Int. Cl.² ............................................. B05D 1/02
[52] U.S. Cl. ................................... 427/244; 427/373; 427/424
[58] Field of Search ............... 427/373, 244, 424, 425; 428/315; 156/78; 239/304, 588; 118/321, 323

[56] References Cited

U.S. PATENT DOCUMENTS

| 1,812,854 | 7/1931 | Beach | 118/323 |
| 3,421,932 | 1/1969 | McGregor, Jr. et al. | 427/244 X |
| 4,035,529 | 7/1977 | Meisert et al. | 427/244 |

FOREIGN PATENT DOCUMENTS 294996  5/1967  Australia ................................. 118/323

Primary Examiner—Morris Kaplan  
Attorney, Agent, or Firm—Cushman, Darby & Cushman

[57] ABSTRACT

Apparatus for continuously depositing a liquid reaction mixture onto continuously moving sheet material which comprises a delivery device having one or more distributors attached to a carriage capable of traversing the moving sheet material in a reciprocating motion, wherein the distributor or distributors are feedably connected to one or more stationary mixing heads. The apparatus is particularly useful for backing 4 to 5½ mm. wide carpet at speeds of from 3 to 6 mm/min. with a flexible foam mix to a foam depth of up to 4 mm.

4 Claims, 1 Drawing Figure

DEPOSITION OF POLYURETHANE FOAM-FORMING LIQUID REACTION MIXTURE

This is a division of Ser. No. 740,023 filed Nov. 8, 1976.

This invention relates to depositing liquid reaction mixtures onto continuously moving web material.

In the manufacture of flexible foam-backed carpets it is well known to distribute polyurethane foam-forming chemicals on the back of a continuous length of carpet from a delivery device, comprising a mixing head and distributor, such as a spray tube and nozzle, mounted on a carriage which traverses the carpet in a reciprocating motion while the carpet is conveyed under the delivery device. The considerable weight of the reciprocating parts, most of which is attributable to the mixing head and contents, imposes a limitation, however, on the speed of traverse and hence on the throughput and/or width of carpet to be backed.

We have now found that this limitation can be circumvented by carrying only the distributor on the carriage and connecting the distributor to a stationary mixing head. Surprisingly, the use of long, flexible tubes connecting the stationary mixing head to the reciprocating distributor has no deleterious effect on the operation of the machine or on the quality of the foam back.

To practice the present invention we provide apparatus for continuously depositing a liquid reaction mixture onto continuously moving sheet material which comprises a delivery device having one or more distributors attached to a carriage capable of traversing the moving sheet material in a reciprocating motion, wherein the distributor or distributors are feedably connected to one or more stationary mixing heads.

The apparatus is particularly suitable for continuously depositing a polyurethane foam-forming mixture on continuous lengths of sheet material such as thermoplastic sheeting, felts and scrims but especially flexible polyurethane foam-forming mixtures on semi-continuous lengths of floor coverings to produce foam-backed carpets.

Thus, by using the present invention, it is now possible to back with foam 4 to 5½ meter wide carpet at a rate of from 3 to 6 meters per minute using a traversing spray head.

Thus according to a further embodiment we provide apparatus for backing 4 to 5½ meter wide carpet with a flexible polyurethane foam to a foam depth of up to 6 mm, which comprises a conveyor for transporting semi-continuous lengths of the carpet at a speed of from 3 to 6 meters per minute and a delivery device for continuously depositing up to 40 kg per minute of flexible polyurethane foam-forming ingredients onto the back of the carpet, the delivery device comprising one or more distributors attached to a carriage for traversing the carpet in a reciprocating motion at a linear speed of up to 250 meters per minute, wherein the distributor or distributors are feedably connected to one or more stationary mixing heads.

The desired thickness of foam backing is usually between 3 and 4 mm requiring of the order of 600 to 800 gm of polyurethane foam-forming mixture/$m^2$. So that for the particular widths of carpet used and throughput rates achieved the delivery device is required to deposit the foam mixture at rates of from 5 to 30 kg/min. Since the commonly available mixing heads are capable of processing a maximum of 12 kg of foam ingredients/minute then at least from 1 to 3 mixing heads with their respective distributors will be used.

Wherever a weight of polyurethane foam-forming ingredients is referred to in this specification, it is to be understood that this does not include the weight of any "filler" material which may be added.

The distributor or distributors may be conventional spray nozzles. Usefully they are fan-shaped and so arranged that the foam-forming ingredients are "fanned-out" in the direction of movement of the carpet and covers a wide band across the carpet. A conventional fan-shaped nozzle located 30 cm above the carpet can deposit foam mix over a 50 to 60 cm wide band. Where two or more nozzles are employed these are conveniently positioned in a line parallel to the direction of movement of the carpet and separated by a distance of 50 to 60 cm. Conveniently the nozzles are pivotally attached to the carriage so that the degree of interference between the sprays can be regulated to keep "ridging" between the bands of foam to a minimum.

To obtain a foam-backed carpet having the desired properties and finish it is preferable to deposit the foam mix in at least eight distinct applications, so that the spray nozzle, in effect, traverses each unit band width of carpet at least eight times. It will be appreciated therefore that the reciprocating carriage will be travelling at high speed, the precise speed depending inter alia on the width and throughput of the carpet and, of course, on the number of nozzles attached to the carriage. Because the present invention does not require the mixing head or heads to be carried on the carriage, it is possible to utilise carriages which are operated by conventional mechanisms and to run these at speeds of up to 250 m/min. Desirably the carriage 'turns round', that is decelerates and accelerates up to constant speed in the opposite direction, in a margin of 5 cms.

The distributor or distributors will normally be feedably connected to the mixing heads by means of flexible tubing of sufficiently large bore to accommodate the passage of the desired quantity of foam-forming ingredients. A coiled flexible nylon tube extendible to a length of at least 3 m is suitable for up to 5½ m wide carpets when the mixing head is located centrally over the moving carpet. A 12 mm bore tube is suitable for feeding a flexible foam mix at a rate of 8 kg/min.

The liquid mixture may be any such mixture of reactive chemicals. In the case of foam-forming mixtures for carpet backing the mixture will contain ingredients such as have already been described in the prior art relating to the manufacture of flexible polyurethane foams. The principal ingredients of such mixtures are an organic polyisocyanate, a polyether or polyester polyol having a hydroxyl number of from 30 to 100 preferably 30 to 70, and water as blowing agent. Additionally the reaction mixture usually contains one or more catalysts and surface active agents and optionally other adjuvants such as fillers, flame-proofing agents and other blowing agents such as trichlorofluoromethane. Suitable polyisocyanates include tolylene diisocyanate and diphenylmethane diisocyanate either of which may be in substantially pure or crude form and mixtures of such isocyanates. Suitable polyols include polyether diols and triols derived from propylene oxide or propylene and ethylene oxides. Catalysts which may be used include organic tin compounds and tertiary amines.

In manufacturing foam-backed carpets, it is important that the liquid mixture partially penetrates the hessian or other base fabric so that when cured it bonds effectively to the carpet and increases the stability of the carpet structure, but it is also important that penetration is not so much as to disfigure the face of the carpet. The degree of penetration can be controlled by regulating the reactivity of the liquid mixture, for example by adjusting the catalyst level. It is often found, however, that the catalyst level giving the desired degree of penetration is not the most suitable level to give a layer of foam having low density and low compression set.

Thus according to a further embodiment of the invention we provide a process for continuously depositing liquid reaction mixtures of different chemical formulations onto continuously moving sheet material which comprises feeding each mixture from a stationary mixing head to one or more distributors attached to a carriage capable of traversing the moving sheet material in a reciprocating motion, depositing a first reaction mixture on to the sheet material and subsequently covering the first reaction mixture with a second reaction mixture of different chemical formulation.

The process is particularly suitable for continuously depositing polyurethane foam-forming mixtures of different formulations onto continuously moving sheet material and especially flexible polyurethane foam-forming mixtures of different formulations onto continuously moving floor covering to produce foam-backed carpets.

Preferably the first reaction mixture is formulated to give the desired degree of bonding to or penetration into the sheet material while the second reaction mixture is formulated to give the desired quality of covering which in the case of foam-backed carpets is a low density and low compression set backing.

By way of illustration, one embodiment of the invention will now be described with reference to the drawing, FIG. 1, filed with the provisional specification which is a perspective view of a carpet backing machine.

In the drawing, a metering unit 1 comprises two sets of feed vessels for different polyurethane foam-forming mixtures consisting of polyol vessels 2 and 3, catalyst vessels 4 and 5 and isocyanate vessels 6 and 7. The two sets of vessels are feedably connected to separate stationary mixing heads 8 and 9 which in turn are feedably connected to separate distributors or spray nozzles 10 and 11 by flexible tubes 12 and 13. The spray nozzles 10 and 11 are attached to a carriage 14 by extension arms 15 and 16 and the carriage is drivably mounted on a beam 17 supported transversely to the direction of movement of an inverted web of carpet 18.

In operation, the carriage 14 and spray nozzles 10 and 11, delivering different foam-forming mixtures, traverse the carpet 18 in a reciprocating motion while the carpet 18 moves continuously forward in the direction shown. The foam-forming mixture delivered by nozzle 10 is formulated to give the desired degree of penetration into the carpet backing while the foam-forming mixture delivered by nozzle 11 is formulated to give a layer of foam having low density and low compression set; the layer of foam deposited by nozzle 10 being oversprayed by the foam from nozzle 11. The nozzles 10 and 11 are pivotally attached to their respective arms 15 and 16 so that the degree of interference between the two sprays can be regulated by varying the nozzle direction. Further, the distance of the nozzles from the beam can be adjusted to permit variation in the spray pattern.

It will be understood that details of the apparatus which has been described may be varied without departing from the essential characteristics of the invention; nor have details been given of various ancilliary equipment normally associated with foam-backing machines. Such equipment includes, for example, draining troughs each side of the carpet to collect overspray at the edges; infra-red pre-heaters to heat the carpet before foam deposition and after-heaters to accelerate curing of the foam after deposition.

The invention is further illustrated by the following Examples which relate to the use of a carpet backing machine of the type hereinbefore described with reference to the drawing.

EXAMPLE 1

In this example a single mixer and spray nozzle were employed. 80 Parts by weight of an oxypropylated oxyethylated glycerol of mean molecular weight 3,500; 20 parts by weight of an oxypropylated oxyethylated glycerol of mean molecular weight 5,200; 3.1 parts by weight of water, 0.4 parts by weight of diazobicyclooctane, 0.7 parts by weight of a polysiloxane-polyoxyalkylene copolymer; 1.0 parts by weight of carbon black dispersed in trixylphosphate, 0.4 parts by weight of stannous octoate and 39.5 parts of 80/20 TDI, were mixed by a high shear rotor rotating at 4,000 revolutions per minute in a conventional cylindrical mixing chamber having an effective volume of 400 cubic centimeters. The resulting mixture was fed at a rate of 8 kg/min through a 5.6 meter long flexible nylon tube of 12 mm internal bore to a spray nozzle giving a fan-shaped distribution pattern. Provision was made for the introduction of a controlled air stream at a pressure of 9 atmospheres into the liquid stream at a point near to the spray nozzle in order to assist and control the atomisation of the liquid spray.

The spray nozzle was reciprocated at a linear speed of 235 meters/minute transversely across the carpet back which was carried under the vertical reciprocating spray at a speed of 3.1 meters/minute. The sprayed back of the carpet was heated from above with a series of infra-red heaters to ensure adequate expansion and cure of the foam. The resulting distribution of foam mix onto the back of the preconditioned carpet resulted in a uniform deposition of liquid with sufficient penetration of the backing fibres to give a satisfactory turft-lock and a layer of foam of thickness between 3.0 and 3.5 mm with an abrasion resistant outer skin. The width of carpet coated was 4.2 meters.

EXAMPLE 2

In this example two mixing heads and spray nozzles were employed. Through the first mixer the mixture of Example 1, but omitting the carbon black, was metered at a rate of 8 kg/min and conditions were similar in all respects except that the width of carpet coated was 5.1 meters and the carpet was carried under the spray at a speed of 5.8 m/min. The mixture fed into the second mixer, at a rate of 10 kg/minute, comprised 100 parts by weight of an oxypropylated oxyethylated glycerol of mean molecular weight 3,500; 4.0 parts by weight of water, 0.3 parts by weight of diazo bicyclo octane, 0.7 parts by weight of a polysiloxane-polyoxyalkylene copolymer, 1.0 parts by weight of carbon black dispersed in trixylylphosphate, 0.4 parts by weight of stannous octoate and 49.5 parts by weight of 80/20 mixture of 2,4 and 2,6 toluene diisocyanate. Both mixers and spray equipment were similar to those of Example 1. The second spray nozzle was reciprocated transversely across the carpet at a distance of 60 cm from the first spray nozzle. The carpet was then passed under a bank of infra-red heaters. The resultant foam-backing was approximately 3.5 mm in thickness with a satisfactory tuft-lock and an abrasion resistant skin.

I claim:

1. Process for depositing a liquid reaction mixture onto web or sheet material which comprises the steps of continuously advancing web or sheet material in a first direction; feeding separately supplies of reactive chemical ingredients to a stationary mixing head and mixing said ingredients in said mixing head to form a polyurethane foam-forming liquid reaction mixture; depositing said reaction mixture onto said web or sheet material from a distributor supplied from said mixing head which is supported on a carriage reciprocating in a second direction transverse to the direction of advancement of said web or sheet material; and thereafter allowing said mixture to react.

2. Process as claimed in claim 1 in which a second reaction mixture of different chemical formulation is deposited onto said web or sheet material from a second distributor also reciprocated in a direction transverse to the direction of advancement of said web or sheet material, subsequent to the deposition of the first reaction mixture.

3. Process as claimed in claim 1 in which the reaction mixture is a flexible polyurethane foam-forming mixture and the web or sheet material an inverted floor covering.

4. Process as claimed in claim 2 in which the web or sheet material is an inverted floor covering and in which the first reaction mixture is a flexible polyurethane foam-forming mixture formulated to give a desired degree of bonding to and penetration into the inverted side of said floor covering and the second reaction mixture is a flexible polyurethane foam-forming mixture formulated to give a foam of a desired density and compression set.

* * * * *